(12) United States Patent
Koo et al.

(10) Patent No.: US 9,201,702 B2
(45) Date of Patent: Dec. 1, 2015

(54) INTEGRATED CLOUD DATA CENTER MANAGEMENT

(75) Inventors: Keith Koo, Fremont, CA (US); Alex Derafshan, Fremont, CA (US); Srikanth Ramakrishna, Santa Clara, CA (US); Wilson Lau, San Francisco, CA (US); Geovanni Hudson, Daly City, CA (US); Paul Sorensen, Sunnyvale, CA (US); Martin Donez, Saratoga, CA (US)

(73) Assignee: MCCIP, Inc., Saratoga, CA (US)

( * ) Notice: Subject to any disclaimer, the term of this patent is extended or adjusted under 35 U.S.C. 154(b) by 149 days.

(21) Appl. No.: 13/475,676

(22) Filed: May 18, 2012

(65) Prior Publication Data

US 2013/0311631 A1 Nov. 21, 2013

Related U.S. Application Data

(60) Provisional application No. 61/603,567, filed on Feb. 27, 2012.

(51) Int. Cl.
| | |
|---|---|
| G06F 15/173 | (2006.01) |
| G06F 9/50 | (2006.01) |
| H04L 29/06 | (2006.01) |
| H04L 29/08 | (2006.01) |
| H04L 12/24 | (2006.01) |

(52) U.S. Cl.
CPC .......... *G06F 9/5072* (2013.01); *H04L 41/0806* (2013.01); *H04L 41/0873* (2013.01); *H04L 41/145* (2013.01); *H04L 67/02* (2013.01); *H04L 67/10* (2013.01); *H04L 67/38* (2013.01); *G06F 15/173* (2013.01); *H04L 41/082* (2013.01)

(58) Field of Classification Search
CPC ............ H04L 41/0253; H04L 41/0806; H04L 41/0816; H04L 41/082; H04L 41/0873; H04L 41/0896; H04L 41/12; H04L 41/145; H04L 41/5003; H04L 41/5054; H04L 41/5067; H04L 41/5087; H04L 41/509; H04L 67/02; H04L 67/10; H04L 67/38; G06F 15/173
USPC ................. 709/223, 200; 705/39, 40; 714/57; 713/2; 707/104.1, 999.107
See application file for complete search history.

(56) References Cited

U.S. PATENT DOCUMENTS

| | | | | |
|---|---|---|---|---|
| 8,635,152 | B2 * | 1/2014 | Das et al. | 705/39 |
| 2004/0172412 | A1 * | 9/2004 | Files et al. | 707/104.1 |
| 2010/0325496 | A1 * | 12/2010 | Kumar | 714/57 |

* cited by examiner

*Primary Examiner* — Kyung H Shin
(74) *Attorney, Agent, or Firm* — Lewis Roca Rothgerber LLP

(57) ABSTRACT

The present invention is generally directed at systems and methods for managing one or more data centers. Systems in accordance with some embodiments of the invention may include a software as a service (SaaS) application including a user interface for designing or modifying a topology, a VAR application in selective communication with the SaaS application and with one or more data stores, configured to determine how to create or modify the topology by configuring the one or more data centers. Methods in accordance with some embodiments of the invention may include receiving a topology design or edit, communicating with one or more data centers, determining how to satisfy the topology design or edit based on the topology design or edit and communications with the one or more data centers; and satisfying the topology design or edit by creating the designed topology or editing the pre-existing topology.

24 Claims, 12 Drawing Sheets

INTEGRATED CLOUD DATA CENTER MANAGEMENT

BACKGROUND OF THE INVENTION

The present invention is generally directed to systems and methods for managing data centers for public, private, and hybrid cloud applications. More specifically, the present invention is directed to providing software as a service (SaaS) to manage the provisioning, application deployment, and/or life cycle management of such data centers.

In general, cloud computing is the delivery or access of computing resources as a service, rather than as a product. Cloud computing allows a user to access resources and data via a network infrastructure linking data centers of the cloud, thereby allowing users to take advantage of shared resources, software, and information. Each data center may comprise a plurality of servers that provide various computing resources. Cloud computing is increasingly recognized as a cost effective means of delivering information technology services through a virtual platform rather than hosting and operating the resources locally.

In data centers or information systems that offer a plurality of application systems, resources are often efficiently created, designed, and allocated using a provisioning process. Provisioning of a server is generally a process that changes the configuration of a pool, or shared, server, to the configuration of a specific application server. Provisioning functions may be sold and provided as a software product.

However, the costs associated with provisioning a system are often quite expensive and out of reach of small and medium sized businesses. Often, smaller companies may offer provisioning systems, but the lower cost and smaller entity providing the service may result in system drawbacks, such as lacking full integration with data center tools. To the extent the smaller companies can perform such services, large amounts of manpower is needed to perform tedious manual processes to accomplish end-to-end provisioning and life cycle management. Such tedious actions typically drain manpower and financial resources.

Accordingly, it is desirable to provide systems and methods that provide a means for provisioning, application deployment, and life cycle management of data centers in an easy, user-intuitive, and cost effective manner. It is further desirable to provide such systems and methods to small and medium sized businesses using public, private, or hybrid clouds.

SUMMARY OF THE INVENTION

Aspects of the invention may comprise cloud-based system for managing one or more data centers, comprising: a software as a service (SaaS) application, the SaaS application comprising a user interface usable by the user for designing, modifying or editing a network topology, the SaaS application sending a message comprising the topology design or modifications to a value added reseller (VAR) application; the VAR application in selective communication with the SaaS application and with one or more data stores, the VAR application configured to determine how to satisfy the message sent from the SaaS application and further configured to create or modify the topology sent from the SaaS application by configuring the one or more data centers.

Additional aspects of the invention may comprise a method of managing one or more data centers through a cloud-based environment, comprising: a first application receiving a topology design or edit from one or more users, a topology design comprising information sufficient to configure a complete topology, a topology edit comprising changes or modifications to a pre-existing topology design; communicating with one or more data centers; determining how to satisfy the topology design or edit based on the topology design or edit and communications with the one or more data centers; satisfying the topology design or edit by creating the designed topology or editing the pre-existing topology.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
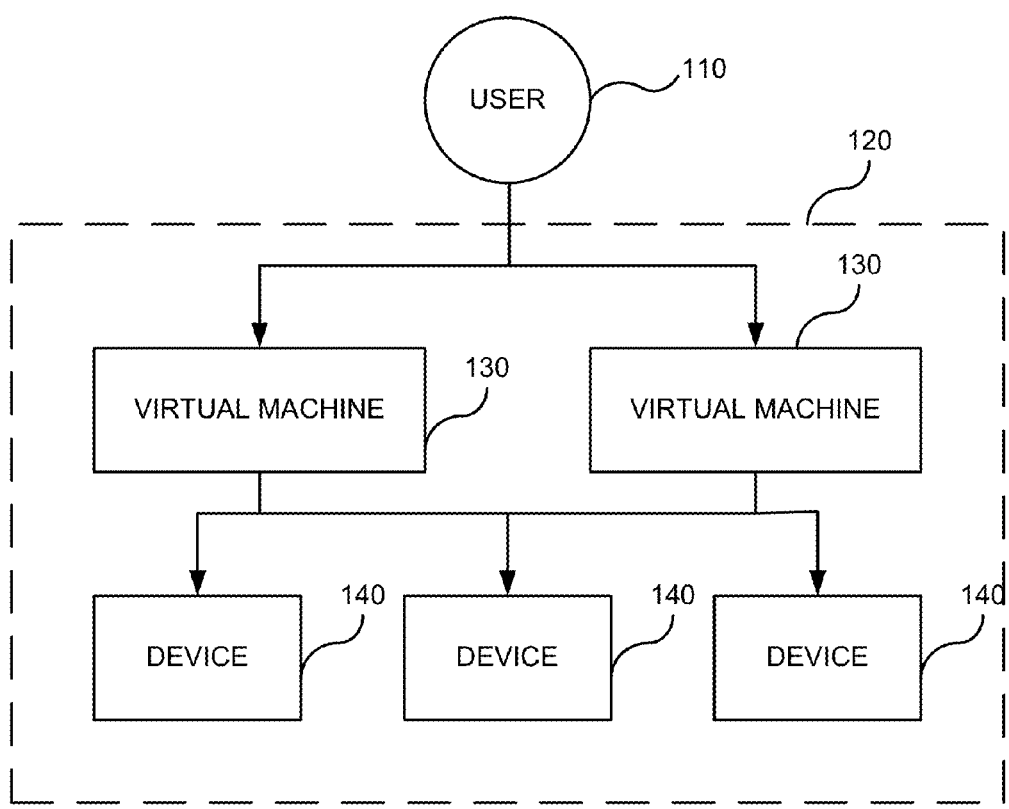
FIG. 1 illustrates a general arrangement of a system for providing integrated cloud data center management in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Reference figures preceded with "S" (e.g., S100) indicate a step.

In general, the present invention is directed towards an integrated cloud management system comprising a graphical node based topology designer with access to a multi-tenant multi-data center provisioning system, offered to users as a service (i.e., SAAS). The cloud management system is hypervisor independent and may be available to users regardless of the specific virtual machine manager utilized by the user. This allows various users access to the system, regardless of their current set-up. In addition, unlike prior art systems, the present invention operates independent of any specific provisioning system, allowing various components and arrangements to be utilized in the provisioning process.

Embodiments of the present invention provide systems and methods to reserve resources in a network. In one embodiment, the network is a cloud environment. In exemplary embodiments, a user creates a desired network topology using a graphic user interface (GUI). For example, in accordance with some embodiments of the present invention, the user may access a SAAS application which may provide for various design components. As a non-limiting example, design components may be depicted in icon form, which the user may select and "drag and drop" into the workspace, similar to the creation of relational charts and diagrams using programs and technology known in the art. Alternatively, the GUI may allow the user to modify existing components or create or submit components of its own. The GUI may be configured to be adaptive, such that a user may select and move various design elements as desired, without requiring new system arrangements to be designed from scratch. Alternatively, users may provide desired network or data center details, such as desired characteristics or attributes of a final network or data center, and the GUI may assist in creating the network topology best suited for the desired characteristics.

With reference to FIG. 1, a cloud computing environment 10, as is typical in the prior art, in which some embodiments of the present invention may be utilized is shown. The cloud computing environment 10 depicts a user 110 who accesses, through the use of a computing device (not shown) one or more clouds 120. The user 110 may access the cloud through a network (such as a WAN, LAN, the Internet, etc.). Clouds 120 may be public, private, or hybrid clouds. Upon accessing the cloud 120, the user 110 can access various resources and applications available on one or more virtual machines or physical machine 140 and networked devices 150. Through the use of the cloud, the user 110 can access computing resources as a service, rather than as a product. Cloud 120 allows user 110 to access resources and data that may be available on virtual machine 140 or available through device 150.

Figure 2:
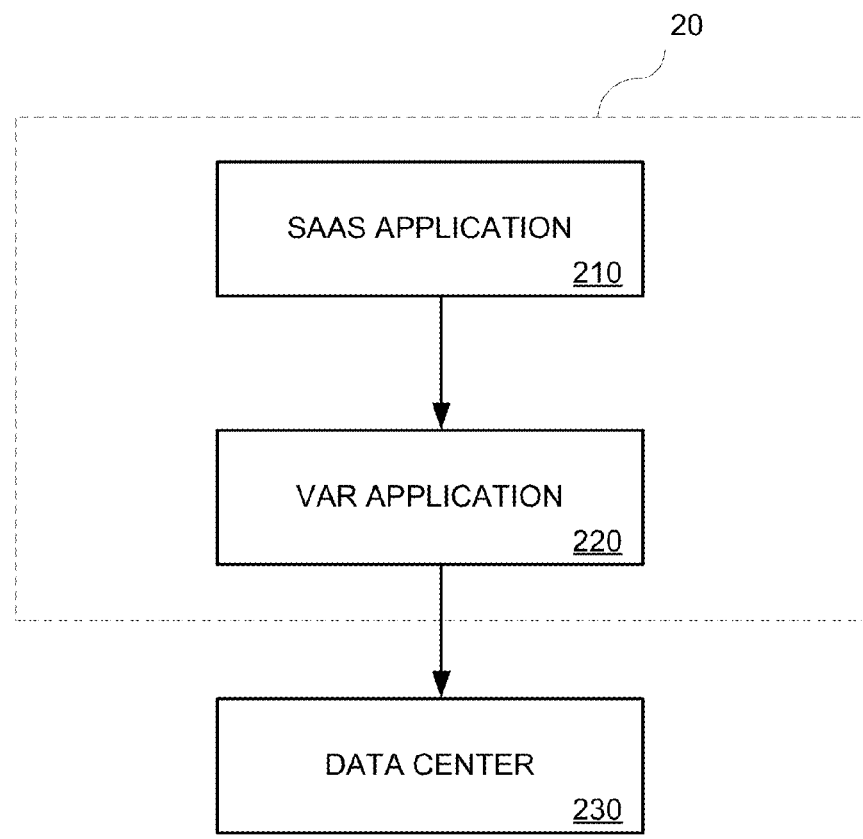
FIG. 2 illustrates a block diagram depicting a system for providing integrated cloud data center management in accordance with some embodiments of the present invention.

With reference to FIG. 2, block diagram depicting a system 20 for managing a data center in accordance with some embodiments of the present invention. System 20 comprises a Software as a Service (SAAS) application 210, a Value Added Reseller (VAR) application 220, and a data center 230. The SAAS Application 210 and VAR Application 220 are available to various users through one or more public, private, or hybrid clouds. Users (not shown) may access the SAAS application 210, through which access may be provided to the VAR Application 220, and one or more data centers 230. Users may access various resources available by and through the SAAS application 210.

Figure 3:
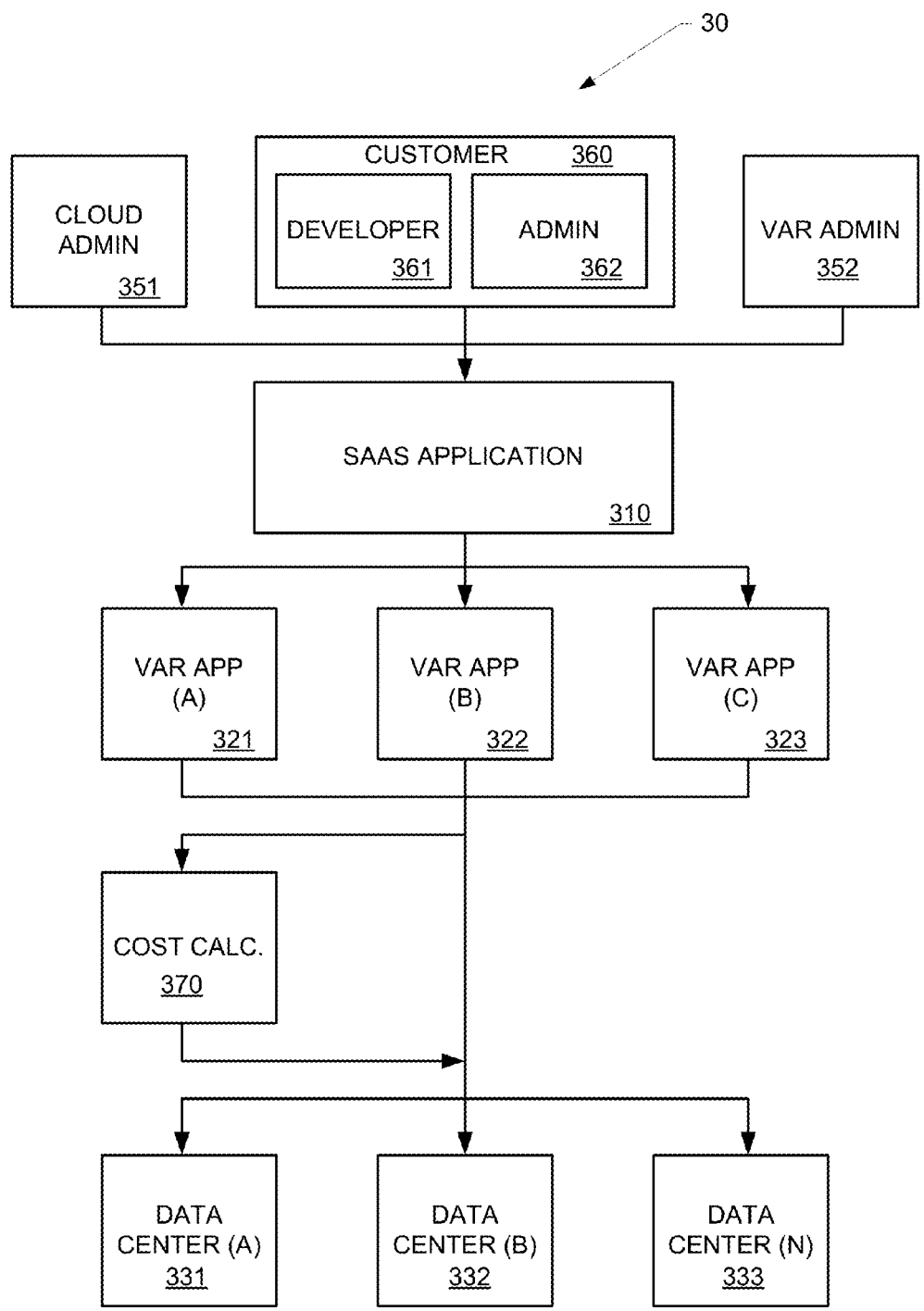
FIG. 3 illustrates a block diagram depicting a system for providing integrated cloud data center management in accordance with some embodiments of the present invention.

With reference to FIG. 3, a system 30 for managing a data center in accordance with some embodiments of the present invention will now be discussed. Various users may access SAAS application 310 ("SAAS App"), and the options and authorizations available to each user may differ depending on the user's role (e.g., identity and status). For example, various users may include cloud admin 351, customer 350, and VAR admin 352. The options and authority of such users may be further divided depending on the specific user. For example, customer 350 may provide varying degrees of options and authorizations between customer developer 361 versus customer admin 362.

It is contemplated that each user—regardless of status or authorization—accesses the system 30 by way of the SAAS App 310. The SAAS App 310 is discussed in detail below, with reference to FIG. 4. However, it is also contemplated that the SAAS App 310 may provide but one of several methods that a particular user or users may access the system 30.

SAAS App 310 may be in selective communication with VAR Admin 352. VAR Admin 352 may further define the specifics of the system designed by customer 360. For example, customer 360 may design a system in an inadvertently inefficient manner, or may note expectations or goals that the designed system may not fulfill. VAR Admin 352 may use the customer design to define and create components for provision from any of the VAR data centers 331, 332, 333. In this manner, VAR Admin 352 may customize the provisioning recipe provided by the customer 360.

SAAS App 310 may be in selective communication with one or more VAR applications 321, 322, 323 ("VAR App"). VAR App 321, 322, 33 may receive a provisioning request from the SAAS App 310. VAR App 321, 322, 333 may receive an asynchronous message from the SAAS App 310 that comprises the topology and/or recipe requested by the user. The VAR App 321, 322, 323 may read the message from the SAAS App 310 and read a local database that may have the characteristics to satisfy the incoming message. Once the determination of how to satisfy the message is complete, the VAR App 321, 322, 323 may execute a script to create the requested topology. As a non-limiting example, the request may be to provision a virtual machine (VM) or a specific application, such as Apache, etc.

VAR App 321, 322, 323 may create the requested topology by selecting the data center 331, 332, 333 that best meets the requirements of the request. Note that the creation of the topology and the determination of how best to fulfill the requested recipe may include taking into account the cost of the request and potential configurations. Such cost may be determined through the use of cost calculator 370, which may determine the cost for various configurations and return the determined cost to the VAR App 321, 322, 323 for conveyance back to the SAAS App 310. In this manner, users may be informed of the costs associated with the request—or various manners of fulfilling such requests—so that educated determinations may be made.

Moreover, VAR App 321, 322, 323 may provide further "intelligent provisioning" based upon various configurable policies noted or requested by customer. For example, VAR App 321, 322, 323 may modify the provisioning recipe based upon desired, optimum, or most efficient performance, security, or based upon network specifics.

Once the topology has been created and provisioned, parties may perform their related responsibilities, if any. For example, the VAR Admin 352 may utilize the SAAS App 310 to configure the created data center. This process may be operate similar to the initial provisioning through the use of SAAS App 310, wherein the VAR Admin 352 may communicate through the SAAS App 310

Once the topology is created, the VAR App 321, 322, 323 may send a message back to the SAAS App 310 that the request has been fulfilled. This message may be conveyed to the user that sent the request, as well as any to any other user impacted by the request.

Throughout the lifecycle of the configured data center, parties 350, 351, 360 may use the SAAS App 310 in order to manage and maintain the system.

Figure 4:
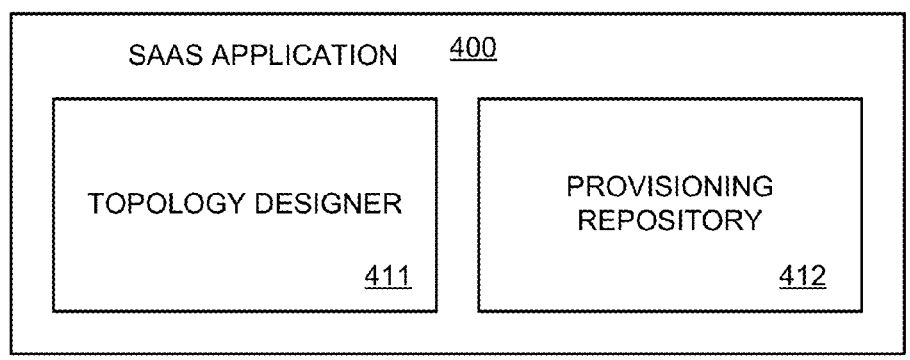
FIG. 4 illustrates a block diagram depicting various aspects of an application component of a system providing integrated cloud data center management in accordance with some embodiments of the present invention.
Figure 5:
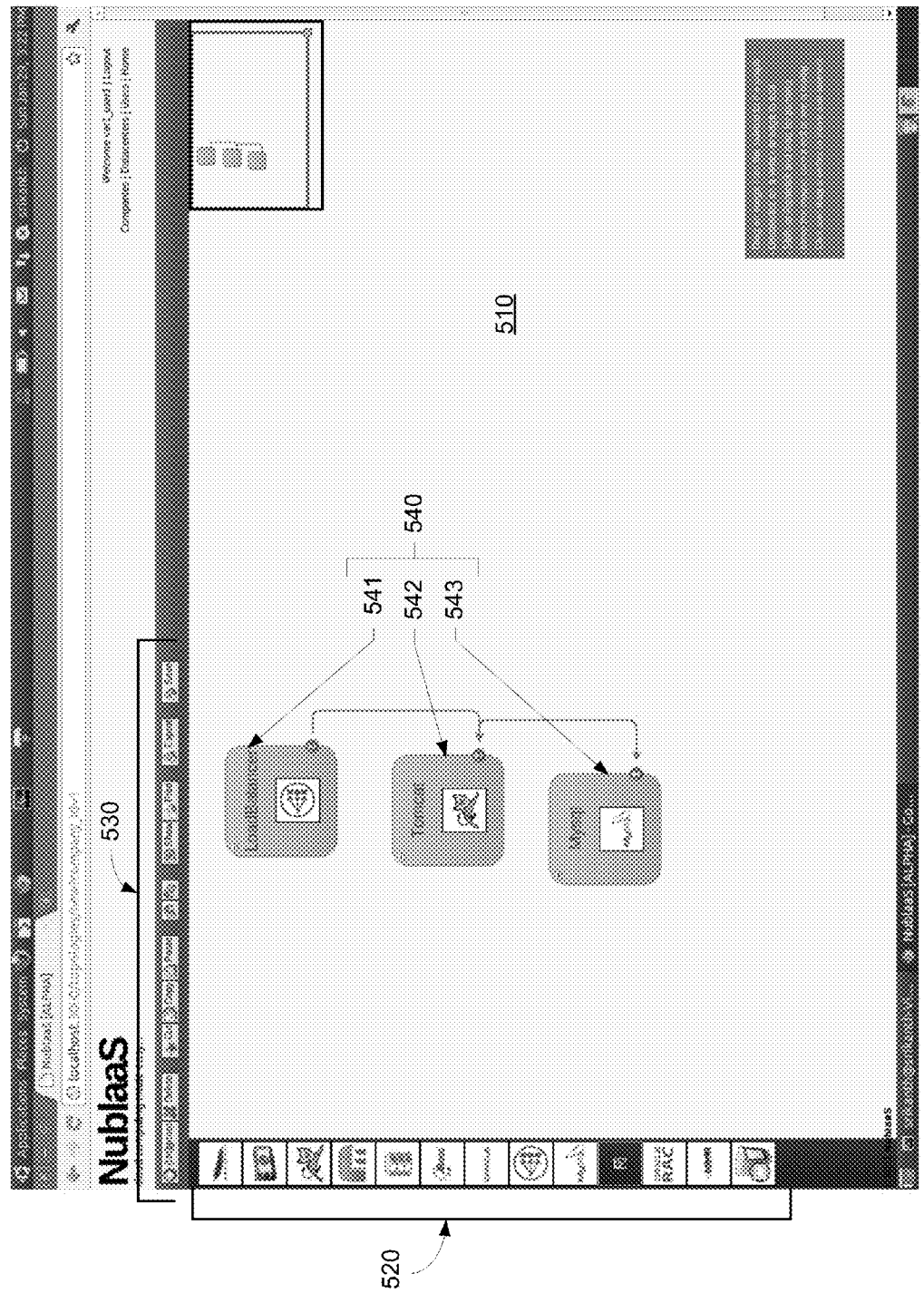
FIG. 5 illustrates graphical user interface for designing a topology to provide integrated cloud data center management in accordance with some embodiments of the present invention.

With reference to FIG. 4, the use of the SAAS App 400 will now be discussed. As noted above, SAAS App 400 is accessed by various users of the system (such as cloud admin, customer developer, customer admin, and/or VAR admin, etc.) during various times of the life cycle of the configured data center. SAAS App 400 may comprise various components, such as a topology designer 411, a provisioning repository 412, asset management module 413, and/or other components (not shown). Other components may comprise one or more of cloud analytics, service desk integration and offering, and/or social networking to connect users, vendors and support staffs thru a public, private, or hybrid cloud With reference to FIG. 5, a topology designer 500 in accordance with some embodiments of the present invention will now be discussed. Topology designer 500 may comprise a workspace 510 into which a user or users may design and virtually construct the desired topology. The topology designer 500 may include a variety of icons 520, or other means of identifying components (including, but not limited to, icons, terms, graphics, images, etc.). The icons 520 may be selected by the user and inserted into the workspace 510. For example, one or more icons may be "dragged and dropped" into the workspace 510.

Similarly, topology designer 500 may comprise various menu selections 530, such as options to cut, copy, paste, delete, show, print, export, and/or save. Utilizing both the component icons 520 and menu selections 530, a user may create his or her desired topology in the workspace 510.

In order to construct the desired topology, users may select—with for example a mouse, cursor, keyboard selection, touch-screen, etc.—one or more components 540 stored in the topology designer component menu 520. These components may be arranged in the workspace 510 by the user, who may also set up various degrees and attributes of connectivity between components. For example, and with reference to FIG. 5, components of LoadBalance 541, Apache Tomcat 542, and Open Source database Mysql 543 may be arranged in the workplace 510. This list is exemplary, and components may comprise any type of program, source, repository, or information that may be utilized by the systems and methods of the present invention.

Figure 6:
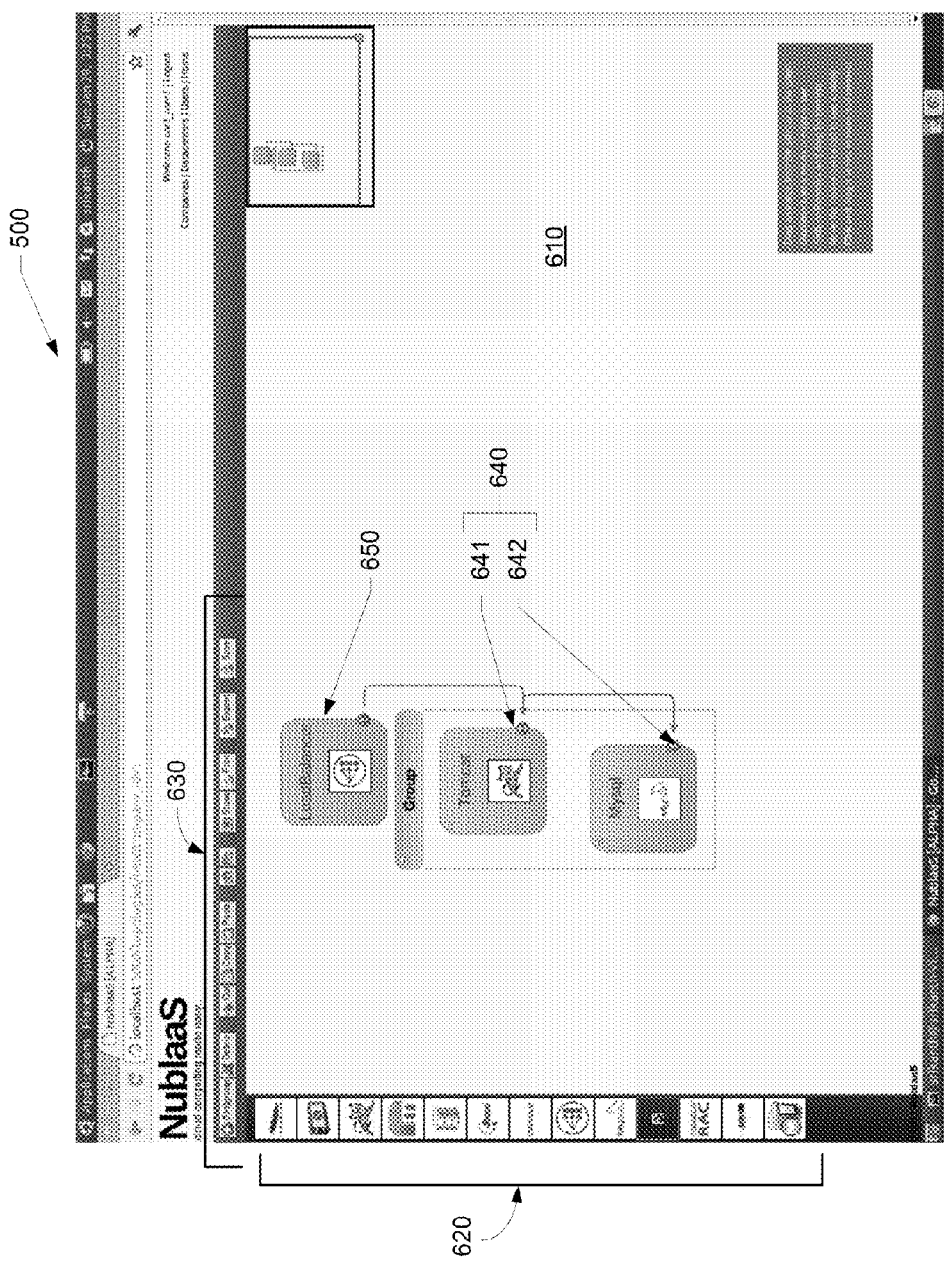
FIG. 6 illustrates a graphical user interface for designing a topology and grouping components in order to provide integrated cloud data center management in accordance with some embodiments of the present invention.

With reference to FIG. 6, other components of a user interface 600 will be discussed. Again, user interface 600 may comprise workspace 610, component menu 620, and menu selections 630. A user may select and arrange components Tomcat 641, Mysql 642, and LoadBalance 650 in the workspace 610. In order to provide various attributes and characteristics, components may be selected and arranged in various groups. For example, Tomcat 641 and Mysql 642 may be grouped together. Through the use of menu selections 630, such components may be grouped (or ungrouped) in various levels or hierarchies.

Note that it is contemplated that various user devices may provide the user interface 600. For example, the user interface 600 may be presented to the user by way of a computer, tablet, mobile device (such as, for example, a mobile telephone), or video game console. In general, any user device that can access the system and provide the user with a graphical user interface may be programmed or equipped to present the user with the user interface 600.

Figure 7:
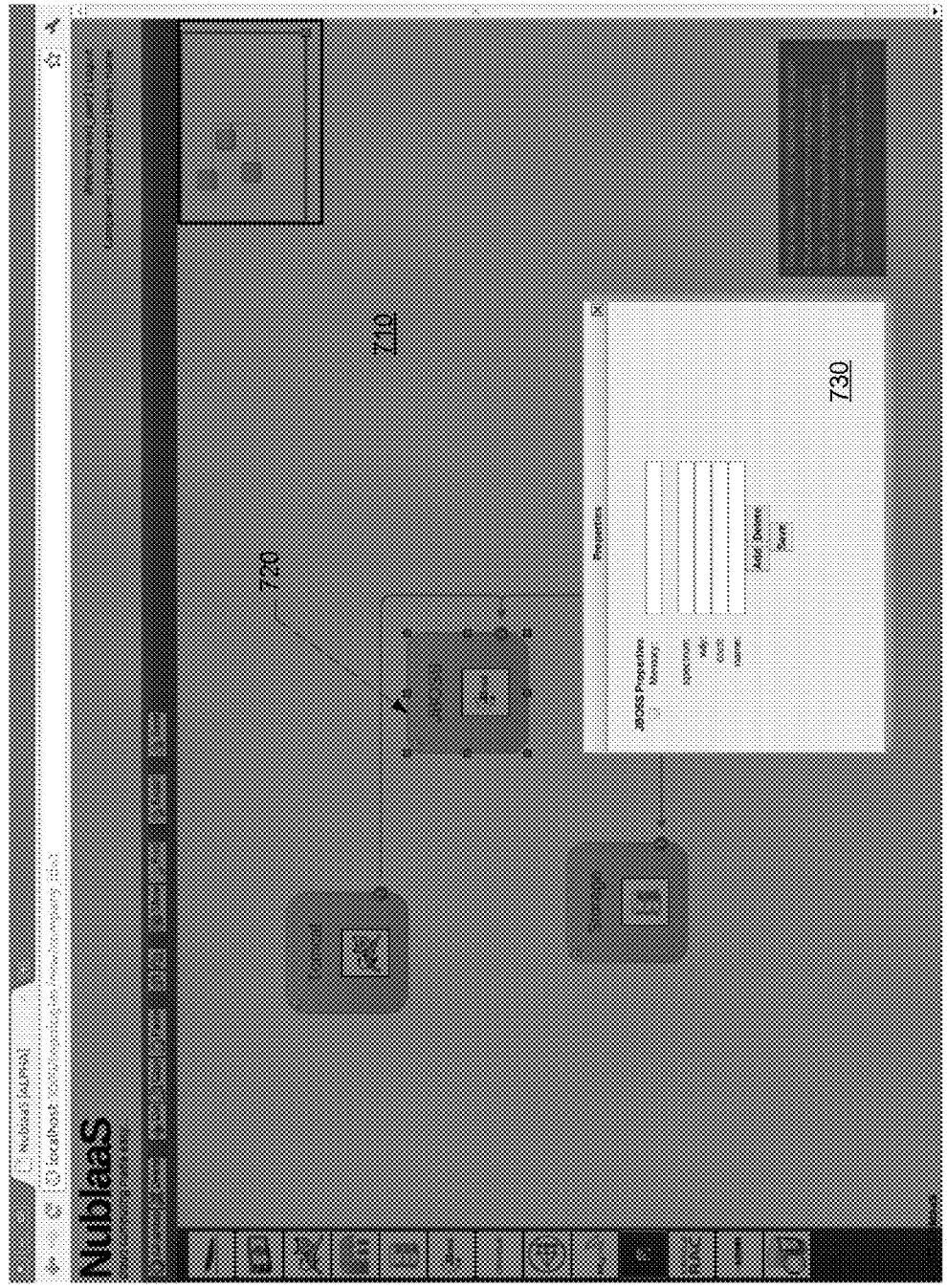
FIG. 7 illustrates a graphical user interface for designing a topology and modifying component properties or attributes in order to provide integrated cloud data center management in accordance with some embodiments of the present invention.

With reference to FIG. 7, through the use of the user interface 700, properties of various components may reviewed or amended by the user. A user may select a component 720 from the workspace 710. The user may then elect to review and/or modify the properties of the component 730. Such election may present the user with the properties, for example the form of an editable menu box 730. In this manner, in addition to designing the specific topology by selecting specific components, the user may modify the properties of each component if so desired.

Figure 8:
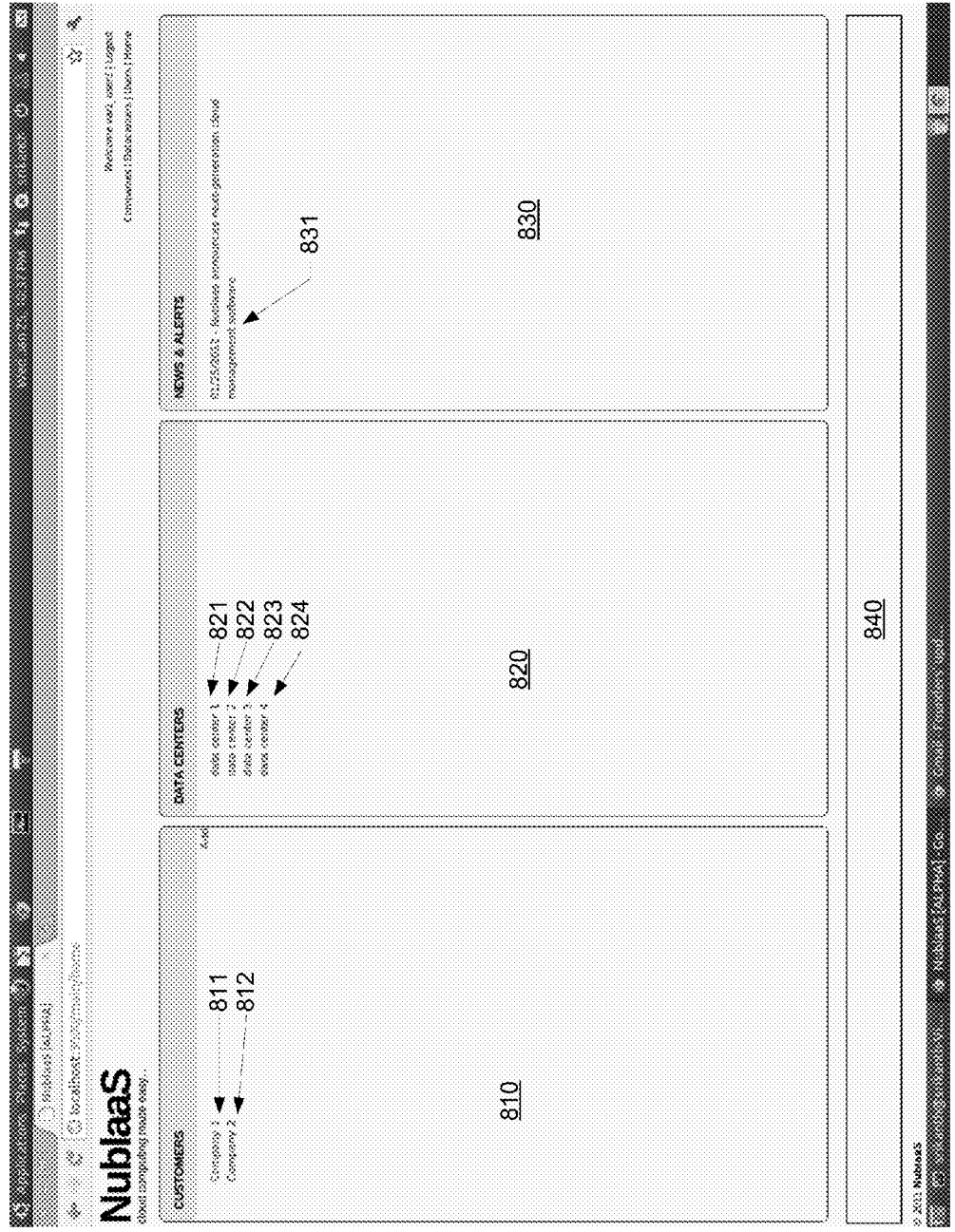
FIG. 8 depicts an exemplary home screen of a graphical user interface for designing a topology to provide integrated cloud data center management in accordance with some embodiments of the present invention.

With reference to FIG. 8, a home display 800 of the SAAS App will now be briefly discussed. The home display 800 may present the user with information regarding customers 810, data centers 820, and news and alerts 830 and any custom modules 840. Customer information 810 may present one or more customers, for example Company One 811 and Company Two 812. The user of the SAAS App may select or click on either of the customers 811, 812 in order to obtain information—for example, the specific topology—regarding each of the customers. Data center information 820 may comprise information on one or more data centers, for example data center one 821, data center two 822, data center three 823, and data center four 824. As with the customer information 810, a user may select or click on any of the data centers 821, 822, 823, 824 in order to review the attributes and characteristics regarding each of the data centers.

In addition, the home display 800 may comprise a news and alerts 830 portion. The news and alerts 830 portion may present to the user various information that may be of interest—or may impact the user's use of the system. For example, news and alerts 830 may display a link to an article 831 or other information source. Custom Module 840 may allow the customer to add custom feeds such as but not limiting to, monitoring, alerts, capacity, chat, calendar, stock prices, and/or customer service interaction.

Figure 9:
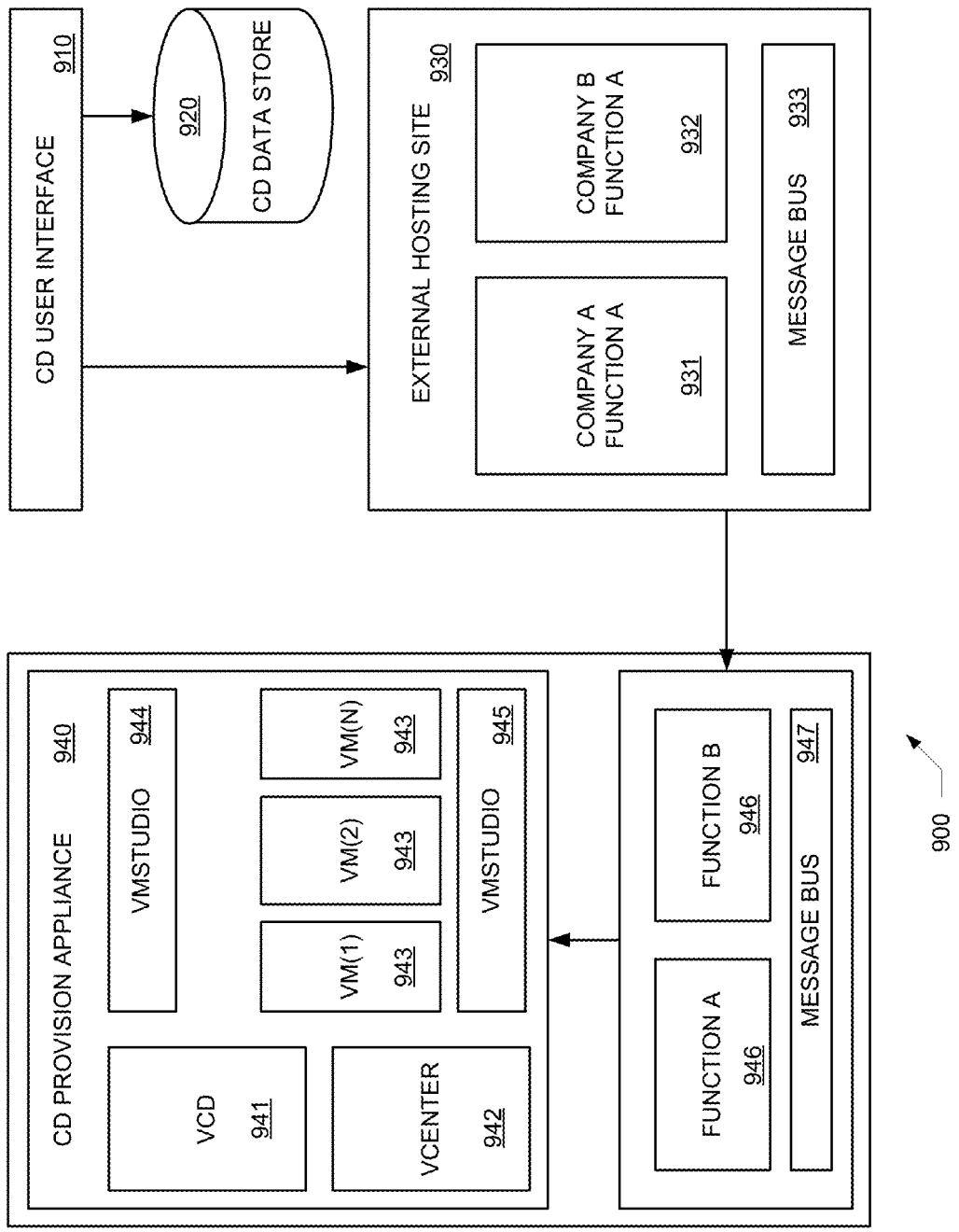
FIG. 9 depicts a block diagram of an integrated cloud data center management system in accordance with some embodiments of the present invention.

FIG. 9 illustrates a customer designer 900 in accordance with some embodiments of the present invention. The Saas User Interface 900 may comprise in general a user interface 910, a Saas User Interface database 920, message 930, and a Saas User Interface provision appliance 940.

Using the user interface 910, a user may be able to create or set forth a functionality desired of the system and saved to a database 920. Alternatively, rather than create a specific data center arrangement from scratch, a user may be able to select existing arrangements—either basic or more specific—from database 920. Note that the user interface may communicate with the database 920 in a persistent data structure, i.e., a structure which preserves the previous version of itself when modified.

Note that the user interface 910 may be configured to capture the user's inputs in a variety of tangible mediums—for example through various programming languages and protocols. As a non-limiting example, a user's inputs into the user interface 910 may be converted into Apex—a specific object-oriented programming language for executing flow and transaction control statements that operates with SalesForce.com (through the Force.com platform server). A programming language such as—but not limited—Apex, may permit business logic to be easily added to the topology design and the manipulation and revision thereof.

Once completed, the user may finalize its design, and the at least a functionality of the design may be captured—at least in part—by a message 930 submitted to an external hosting site—for example, SalesForce.com. The message 930 may comprise various functions, such as Company A—Function "a" 931 and Company B—Function "b" 932, as well as message bus 933. Message bus 933 may be a message format for communicating between mutually interacting software applications, and may transport the design concept of the system or functionality.

Custom design provision appliance 940 may receive the message bus 947 including the included functions 946 submitted to the CD provision appliance 940. The functions recited by the message bus 933 may invoke a VMWare API (that is, an application programming interface provided by or configured according to standards set forth by VMWare, Inc.) in order to be performed. The message may be received and performed by the CD provision appliance 940, which may comprise a virtual custom designer (vCD) 941, virtual center (VCenter) 942, one or more virtual machines (VM1, VM2) 943, a virtual machine studio (VMStudio) 944, and a virtual application (vApp) 945.

VCenter 942 may comprise a platform that forms the foundation for virtualization management, thereby allowing users control over the virtual environment. For example, the VCenter 942 may provide users with centralized control at every level of the virtual infrastructure.

VM1, VM2 943 may comprise one or more virtual machines that may be treated and maintained as a separate entity. VM1, VM2 943 are virtual machines insomuch as each may comprise a software implementation of a machine. VMStudio 944 may comprise any program or studio which may assist an author in creating or modifying vApps 945 and virtual appliances. vApp 945 may comprise any type of software solution optimized for a cloud environment, generally—but not required to be—comprised of multiple virtual machines (VM1, VM2 943) packaged and maintained as a single entity.

Note that while the present invention interacts with various vApps 945 and virtual machines 943, the systems and methods of the present invention are hypervisor independent. In other words, the systems and methods of the present invention may work with various virtual systems regardless of the origin software that controls or controlled the virtualization. In this manner, the present invention can function regardless of the specific operating system or virtual operating platform presented to the user.

[Flush out the Interactions Between the Elements (VCD, VCenter, VM, VMStudio, VApp]

Figure 10:
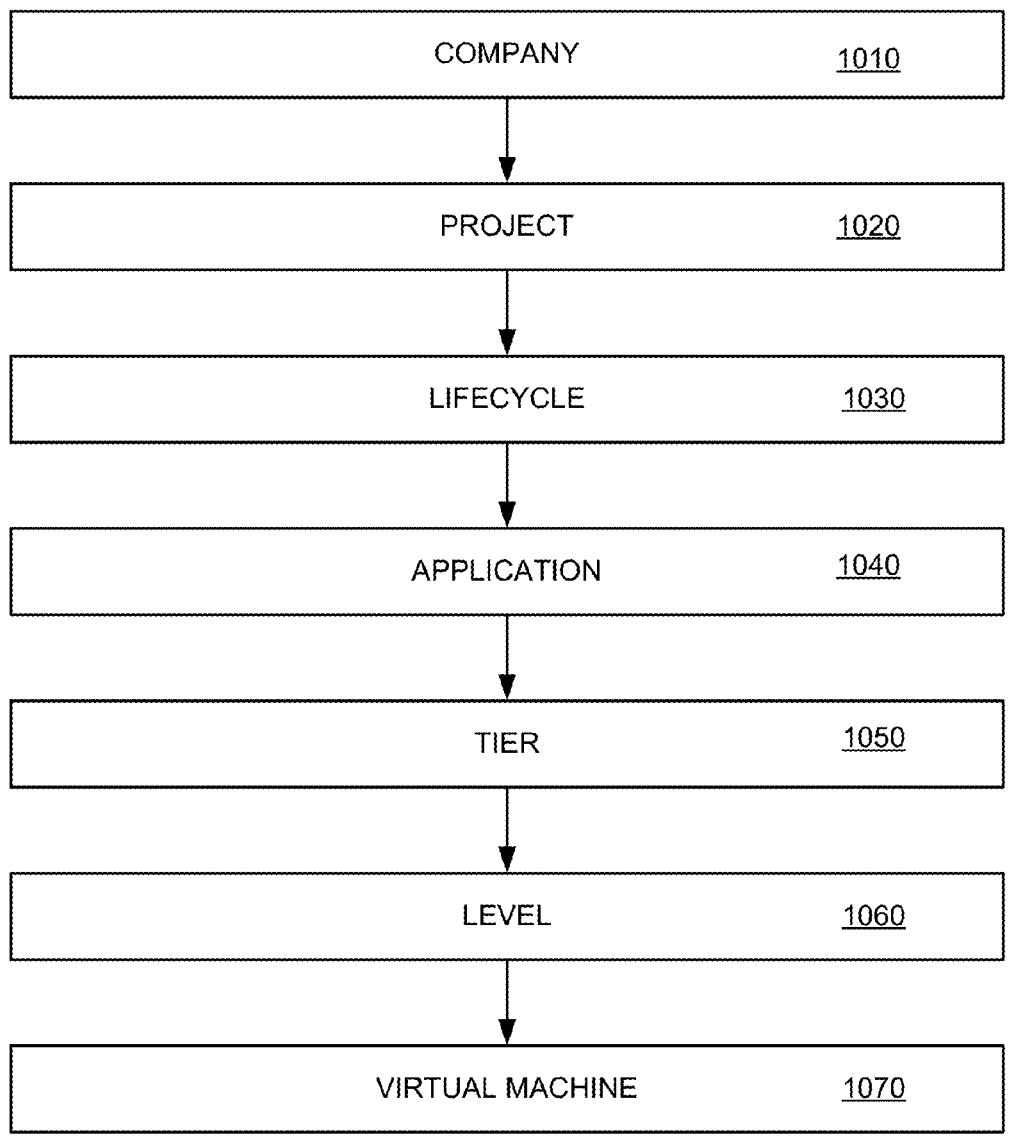
FIG. 10 illustrates various levels of control and attributes of an integrated cloud data center management system in accordance with some embodiments of the present invention.

With reference to FIG. 10, a system 1000 in accordance with some embodiments of the present invention will now be discussed. In order to understand the various interactions and relations between different entities and levels of entities the system will be described in broader terms.

System 1000 may comprise a company 1010, which may define a project 1020. The project 1020 may be premised upon the specific point in the lifecycle 1030 of the project 1020. Depending on the lifecycle 1030, an application 1040 may be defined. The application 1040 may further define a tier 1050, and may potentially further define an additional level 1060 based upon any user or system selected or desired characteristic. Finally, based upon one or more of such levels, and characterizations, a specific virtual machine 1070 may be defined. Each level can be broken into various levels. In other words, under a single company 1010, there may be multiple projects 1020. Each project may pertain to multiple points in the lifecycle 1030. Each point in the lifecycle 1030 may set forth multiple applications 1040. Each application 1040 may set forth multiple tiers 1050. Each tier 1050 may correspond to multiple levels 1060, which in turn may comprise multiple virtual machines 1070.

Figure 11:
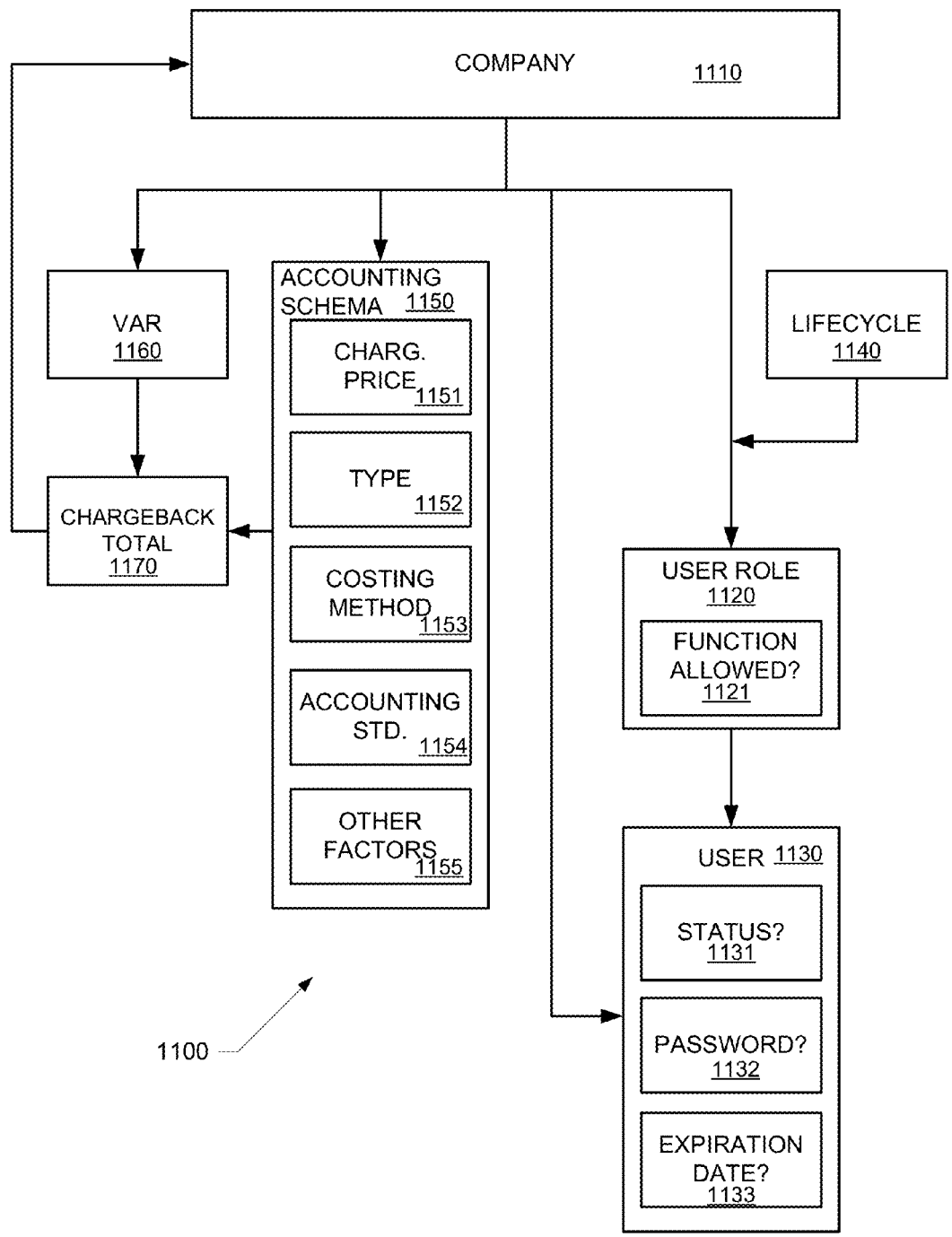
FIG. 11 illustrates various exemplary degrees of connectivity for a single level of an integrated cloud data center management system in accordance with some embodiments of the present invention.

With reference to FIG. 11, a system 1100 regarding specifics regarding the connections and attributes related to a company 1110 will now be discussed. Company 1100 may define user roles 1120 that may identify various privileges and attributes based predefined roles. For example, roles may comprise Admin, super-admin, release, quality assurance, development, production, pre-production, etc. User roles 1120 may be used to evaluate if a function sought by the user is allowable 1121.

Note that user roles 1120 may also be connected to the specific lifecycle 1140 of the Project—as the state of the project may define what user roles are relevant. For example, if the project is in its infancy, user roles related to production and release may be irrelevant or misplaced. Under the user role 1120, specific users 130 may be defined. Specific users 1130 may include attributes such as user status 1131, password 1132, and expiration date 1133.

Company 1110 may also be connected to value added reseller (VAR) 1160. Both company 1110 and VAR 1160 may be provide various inputs, and receive various outputs from accounting schema 1150. Accounting schema 1150 may comprise various attributes such as chargeable price 1151, type (i.e. VAR company) 1152, costing method 1153, accounting standard 1154, and/or other factors 1155. Depending on the specific project, lifecycle, application, tier, and virtual machine—various costs may be considered by the by the accounting schema 1150 through communications with both the company 1110 and the VAR 1160. Between the VAR 1160 and the accounting schema 1150, a chargeback total 1170 may be determined. The chargeback total 1170 may be provided to the company 1110. In this manner, various modifications or alterations proposed by the company 1110 or the VAR 1160 may be automatically considered by the accounting schema 1150 and considered by the chargeback total 1170.

Figure 12:
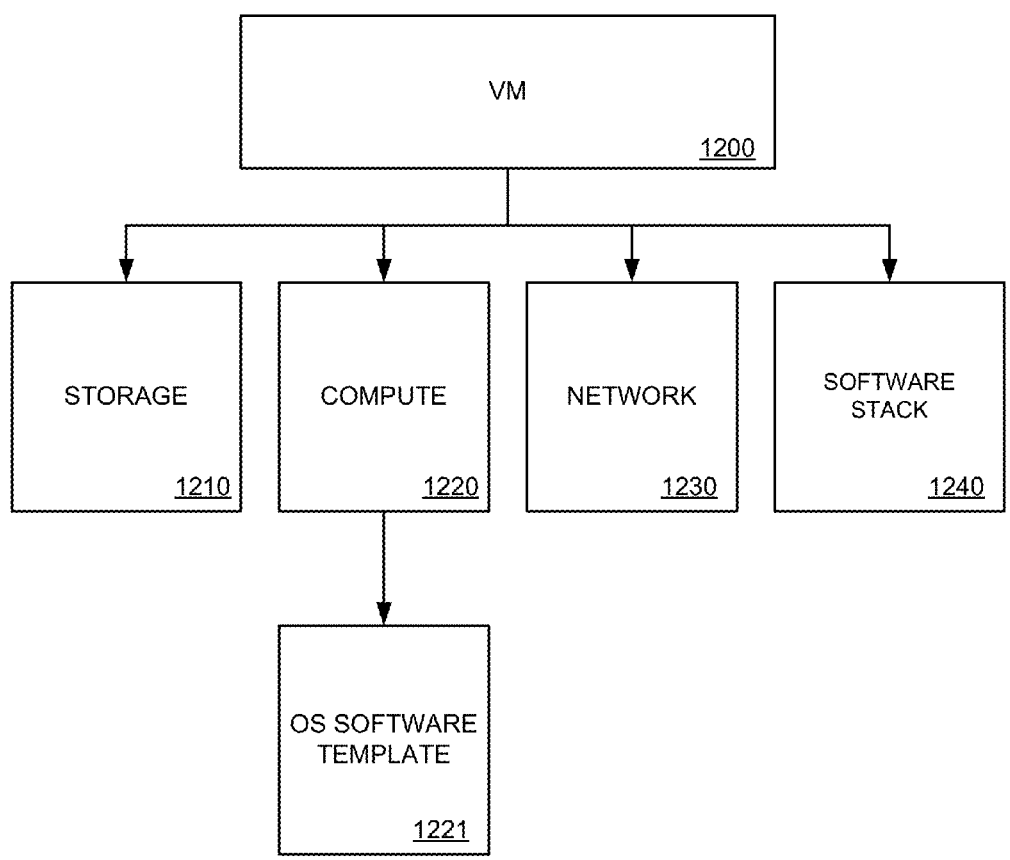
FIG. 12 illustrates various exemplary degrees of connectivity for a single level of an integrated cloud data center management system in accordance with some embodiments of the present invention.

With reference to FIG. 12, connections related to a virtual machine 1200 (denoted in FIG. 10 by reference numeral 1070) will now be discussed. Virtual machine 1200 may be connected to a storage facility 1210. Virtual machine 1200 may also be connected to a computing device 1220, which may in turn be connected to operating system software template 1221. Virtual machine 1200 may therefore be able to operate on multiple operating systems. Virtual machine 1200 may also be connected to a network 1230 and a software stack 1240. In this manner virtual machine 1200 may be connected to various networks 1230, software stacks 1240, storage devices 1210, and computing devices 1220 running one or more operating systems. Accordingly, virtual machine 1200 may run in various different manners and on various networks and software.

The integrated cloud data management systems and methods of the present invention may therefore provide companies and users the ability to create a desired topology, and understand the costs associated with the desired topology through communication with an accounting schema and a relevant VAR. Once the design is finalized, it may be provisioned through the use and deployment of virtual machines operating at various levels. Access to the provisioning system may be based upon a specific user and a specific user role. In this manner, companies and entities of various sizes and resources may be able to accurate, efficiently, and affordably configure data centers to suit specific needs.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A computerized system for managing one or more cloud-based data centers to enable one or more users to design or edit network topology, each user enabled to design or edit the network topology based upon an assigned user role, the computerized system including a memory for storage of programs and instructions, the system comprising:
a software as a service (SaaS) application, the SaaS application comprising a user interface usable by the user for designing, modifying or editing a network topology of one or more virtual machines, wherein the user interface displays a plurality of pre-defined components and menu options, the SaaS application sending a message comprising one or more selected components and menu options selected by the user to a value added reseller (VAR) application; and
the VAR application in selective communication with the SaaS application and with one or more virtual machines comprising one or more data stores, the VAR application configured to determine how to satisfy the message sent from the SaaS application and further configured to create or modify the topology sent from the SaaS application by configuring the one or more virtual machines comprising one or more data centers based on the selected components and menu options.

2. The computerized system of claim 1, wherein the user interface of the SaaS application comprises a workspace in which the user designs, modifies, or edits the network topology.

3. The computerized system of claim 2, wherein the user interface further comprises graphical representations of components and connectivity that may be used by the user in designing the topology.

4. The computerized system of claim 3, wherein the user interface further comprises the ability to establish or modify properties of the components and connectivity.

5. The computerized system of claim 1, wherein each assigned user role entitles the user to specific authorizations, actions, and options presented by the SaaS application.

6. The computerized system of claim 5, wherein each assigned user roles is selected from the group consisting of cloud administrator, customer developer, customer administrator, and value added reseller administrator.

7. The computerized system of claim 5, wherein each assigned user role is characterized by the lifecycle point of the data center management, and wherein each lifecycle point entitles the user to specific authorizations, actions, and other options presented by the SaaS application.

8. The computerized system of claim 7, wherein the lifecycle point of the data center management is selected from the group consisting of design, development, preproduction, production, and release.

9. The computerized system of claim 1, wherein each user has a specific authorization level based at least in part on the characteristics associated with the user selected from the group consisting of one or more companies associated with the user, one or more projects associated with the user, one or more lifecycle points of the data center management associated with the user, and one or more applications associated with the user.

10. The computerized system of claim 1, wherein the message sent from the SaaS application to the VAR application comprises an asynchronous message.

11. The computerized system of claim 1, wherein the VAR application determines how to satisfy the message sent from the SaaS application based at least in part upon information stored in the one or more data stores of the one or more virtual machines.

12. The computerized system of claim 1, wherein the VAR application determines how to satisfy the message sent from the SaaS application based at least in part upon costs associated with various configurations that meet the requirements of the message.

13. The computerized system of claim 1, wherein the VAR application may determine how to satisfy the message sent from the SaaS application based at least in part upon configurable policies noted or requested by the user.

14. The computerized system of claim 1, wherein the VAR app creates the topology by executing a script with the one or more data centers of the one or more virtual machines.

15. The computerized system of claim 1, wherein the selected components or menu selections indicate one or more groups in a hierarchy.

16. A computerized method of managing one or more data centers on one or more virtual machines through a cloud-based environment, comprising:
receiving by a first application a virtual machines topology design or edit from one or more users, a topology design comprising information sufficient to configure a complete topology of one or more virtual machines, a topology edit comprising changes or modifications to a pre-existing topology design of one or more virtual machines based on user selections of one or more components and menu options, wherein the user selections are made from an interface displaying a plurality of pre-defined components and menu options;

communicating with of one or more virtual machines comprising one or more data centers;

determining how to satisfy the topology design or edit based on the topology design or edit and communications with the one or more data centers of the one or more virtual machines;

satisfying the topology design or edit by creating the designed topology or editing the pre-existing topology of the one or more virtual machines based on the selected components and menu selections.

17. The computerized method of claim 16, wherein the information sufficient to configure a complete topology comprises one or more inputs from the one or more users.

18. The computerized method of claim 17, wherein the information sufficient to configure a complete topology comprises general information related to policies, performance, security, network specifics or costs.

19. The computerized method of claim 16, wherein the topology edit comprises one or more inputs from the one or more users.

20. The computerized method of claim 19, wherein the topology edit further comprises general information related to policies, performance, security, network specifics or costs.

21. The computerized method of claim 16, further comprising:

creating a message comprising the complete topology;

sending the message to a second application, the second application communicating with the one or more virtual machines comprising one or more data centers and determining how to satisfy the incoming message.

22. The computerized method of claim 16, further comprising:

communicating with the one or more users and receiving inputs from the one or more users.

23. The computerized method of claim 22, wherein the inputs received from the one or more users comprises user responsibilities.

24. The computerized method of claim 23, wherein the user responsibilities comprise configuring the one or more data centers.

* * * * *